June 18, 1940.  W. P. MUNSELL  2,205,303
FLOWERPOT FOR WATER-CULTURED PLANTS
Original Filed June 9, 1938
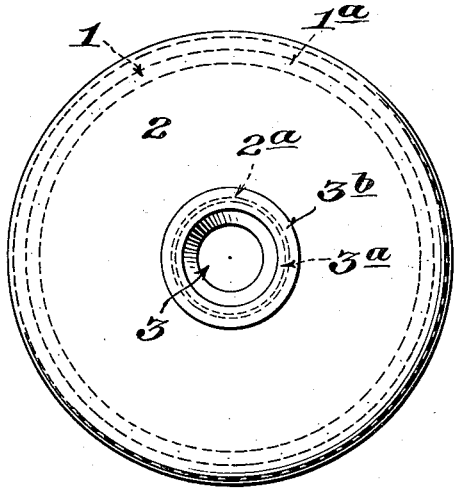
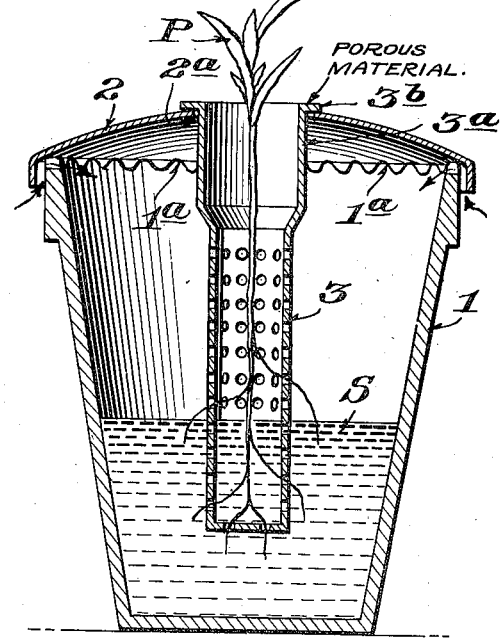
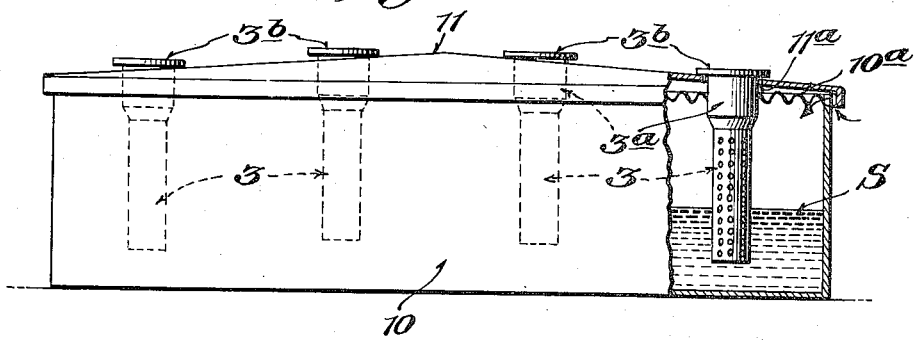
Inventor
William P. Munsell
By Alexander Dowell
Attorneys Patented June 18, 1940

2,205,303

UNITED STATES PATENT OFFICE 2,205,303

FLOWERPOT FOR WATER-CULTURED PLANTS

William P. Munsell, Coral Gables, Fla.

Application June 9, 1938, Serial No. 212,814
Renewed May 3, 1940

12 Claims. (Cl. 47—1.2)

This invention is a novel improvement in flowerpots or tanks for water-cultured plants, the pots containing a nutrient water solution of concentrated plant food composed of a number of minerals in proportions essential to plant growth.

The principal object of my invention is to provide a novel pot or tank particularly designed for use in such plant cultivation, same consisting of a pot or tank adapted to hold the nutrient solution, and provided with a cover adapted to admit air into the pot while shedding water and excluding light rays, said cover being provided with one or more perforated plant holding cylinders into which the roots of the plant entwine, the cylinders with their plants being readily removable from the cover of the pot or tank without disturbing the plant roots, whereby the plants may be transplanted without retarding their growth.

A further object is to provide a perforated cylinder for the above purpose formed of porous material whereby as the level of the nutrient solution lowers by evaporation in the pot or tank the solution will however be fed to the uppermost roots of the plants due to capillary attraction through the porous walls of the cylinder.

I will explain the invention with reference to the accompanying drawing which illustrates several practical embodiments thereof to enable others to adopt and use the same; and will summarize in the claims, the novel features of construction, and novel combinations of parts, for which protection is desired.

In the drawing:

Fig. 1 is a vertical section through a flowerpot embodying my invention.

Fig. 2 is a top plan view thereof.

Fig. 3 is an end elevation, partly in section, showing a tank embodying my invention adapted for water-culturing a plurality of plants.

As shown in Figs. 1 and 2, my invention comprises a pot 1 of general flowerpot shape, adapted to hold a nutrient water-culture solution S. The pot is preferably made of material impervious to light, and is of sufficient depth to permit a relatively large air space between the top of the solution S and the underside of the cover 2 of the pot. This air space is provided in order to permit aeration of solution S as it rises by capillary action up the walls of the plant holding cylinder 3, hereinafter described. Preferably the upper rim of pot 1 is scalloped or corrugated, as at 1a, so that cover 2 will not fit tightly but will permit air to enter and circulate into the pot as shown by the arrows, Fig. 1, said scallops 1a however being preferably of slight depth to exclude light rays from entering the pot to any large extent.

Cover 2 is also impervious to light rays and is provided at its center with a hole 2a of substantial size adapted to receive a perforated cylinder 3, hereinafter described. Cover 2 extends beyond the sides of the rim and is seated upon the tops of the corrugations 1a. Cover 2 is preferably arched upwardly as shown in order to shed rainwater and to maintain a substantially constant nutrient value in solution S, thus obviating the necessity of frequent tests and replacements of the said solution particularly during rainy periods. Such arched cover will shed a large percentage of rain-water since the only water which can enter the pot is that which strikes the small bedding area in the top of perforated cylinder 3 which is set in the cover.

Extending through the hole 2a of the cover is a perforated cylinder 3 of small diameter having a cylindrical enlargement 3a at its upper end terminating in an external annular flange 3b, the portion 3a snugly fitting said hole 2a and the flange 3b seating squarely upon the top of the cover adjacent the hole. Cylinder 3 is thus firmly but removably installed in cover 1 by merely pushing it through the hole 2a. Cylinder 3 however could be firmly seated on a base built up on the bottom of the pot. Perforated cylinder 3 extends down into pot 1 and terminates a short distance above the bottom thereof, and the seed, bulb, or small plant P is bedded in the top of said cylinder 3. As it grows, the plant roots extend down into the cylinder and entwine therein and through the perforations, and thus the cylinder 3 provides a firm support for the plant P to root, and establishes a firm foundation to hold the plant upright. Because the plant P is growing in water it requires a support of this nature. Cylinder 3 is preferably made of porous material so that, as the level of solution S gradually lowers due to evaporation in pot 1, said solution will rise through the walls of the cylinder through capillary attraction and continue to feed by wick action such upper roots as may become exposed.

The design of the cover 2 and the cylinder 3 is such that the cylinder can readily be detached from the cover, and thus the plant P, together with its cylinder 3 in which the roots have entwined, can be easily removed as a unit from pot 1 without disturbing the roots, as the upper part 3a of the cylinder is considerably larger than the lower perforated part, allowing the roots to be pulled without damage through hole 2a in the cover. Thus, transplanting can be accomplished without damage to delicate root structure, and when a customer buys a potted plant at a greenhouse, the salesman simply removes the plant P, with its cylinder 3 and roots intact, from pot 1 and from the solution S in which it has grown. The cylinder and roots may then be wrapped in moist paper, and the customer may take the plant home and replant same without the roots being disturbed or the growth of the plant retarded.

These same principles can be applied to the design of water-culture tanks, as well as flowerpots, by providing in the cover of the tank a number of holes, properly spaced, through which perforated cylinders 3 can be set and partially immersed in the nutrient solution. Fig. 3 discloses such modification, same taking the form of a tank 10 having an arched cover 11 provided with a plurality of holes 11a receiving a plurality of perforated cylinders 3 extending down into the nutrient solution S. The upper rim of tank 10 is scalloped as at 10a to permit aeration of the nutrient solution S under the cover 11 while excluding light as previously described with respect to the pot shown in Figs. 1-2.

Water-culture tanks now in use are usually covered with tops constructed as follows: The frame of the cover is bottomed with chicken wire, on which strips of burlap are laid, on which a layer of excelsior, sawdust, or similar material is placed. When a heavy rain falls on such tanks, all rain that is caught by the covers runs through the covers into the tanks, thus diluting the nutrient solutions. Such tanks even overflow in heavy rains.

When using an arched cover fully 95% of the rainwater which strikes the cover is shed; and the only rain which enters the pot is that which strikes the small bedding area in the top of the perforated cylinders 3 which are set in the cover. Inasmuch as such tanks are mostly used out-of-doors, the fact that this type of cover 11 sheds rain-water is a valuable feature as it tends to maintain a constant nutrient value in the solution S, and it largely prevents the necessity of additional expense and labor in testing and replacing the solution frequently during rainy periods.

I do not limit my invention to the exact forms shown in the drawing for obviously changes may be made therein within the scope of the claims.

I claim:

1. A flowerpot or tank for water-cultured plants comprising a receptacle adapted to hold a nutrient solution; a cover providing an air space in the receptacle above the solution level; means for admitting air into said space while excluding light therefrom; and one or more perforated members mounted in the cover and extending down into the solution and adapted to support the entwined roots of plants.

2. In a pot or tank as set forth in claim 1, each perforated member being formed of porous material whereby the solution will rise by capillary attraction to the upper portion of the member.

3. In a pot or tank as set forth in claim 1, said admitting means comprising corrugations in the upper rim of the receptacle, and said cover resting on the corrugations and extending beyond the rim.

4. In a pot or tank as set forth in claim 1, said cover having one or more holes therein; and each said perforated member comprising a cylinder having an imperforated cylindrical enlargement at its upper portion adapted to snugly fit a hole, and having means at its upper end to support the cylinder on the cover whereby the member may be withdrawn upwardly through the hole with the entwined roots extending through said perforations in the lower portion of the cylinder.

5. A flowerpot or tank for water-cultured plants comprising a receptacle adapted to hold a nutrient solution; a cover providing an air space in the receptacle above the solution level; means for admitting air into said space while excluding light therefrom; and one or more perforated cylinders removably mounted in the cover and extending down into the solution and adapted to hold and support the entwined roots of plants contained therein, whereby the plants and cylinders may be removed as units from the receptacle and cover.

6. In a pot or tank as set forth in claim 5, each perforated cylinder being formed of porous material whereby the solution will rise by capillary attraction to the exposed roots in the upper portion of the cylinder.

7. In a pot or tank as set forth in claim 5, said admitting means comprising corrugations in the upper rim of the receptacle, and said cover resting on the corrugations and extending beyond the rim with its outer periphery spaced therefrom.

8. In a pot or tank as set forth in claim 5, said cover having one or more holes therein; and each said cylinder having an imperforated cylindrical enlargement at its upper portion adapted to snugly fit a hole, and having means at its upper end to support the cylinder on the cover, whereby the member may be withdrawn upwardly through the hole while the roots are entwined through said perforations in the lower portion of the cylinder.

9. In a pot or tank as set forth in claim 5, said cover having one or more holes therein; and each said cylinder having an imperforated cylindrical enlargement at its upper portion adapted to snugly fit a hole, and having an external annular flange at its upper end adapted to overlie the cover adjacent the hole, whereby the member may be withdrawn upwardly through the hole with the roots entwined through said perforations in the lower portion of the cylinder.

10. In a pot or tank as set forth in claim 5, said cover having one or more holes therein; and each said cylinder of porous material having an imperforated cylindrical enlargement at its upper portion adapted to snugly fit a hole, and having means at its upper end to support the cylinder on the cover, whereby the member may be withdrawn upwardly through the hole with the roots entwined through said perforations in the lower portion of the cylinder.

11. A flowerpot or tank for water-cultured plants comprising a receptacle adapted to hold a nutrient solution; a cover for the receptacle; and one or more perforated cylinders of porous material mounted in the cover with their lower ends extending down into the solution and adapted to support the entwined roots of plants contained therein, the solution being fed by capillary attraction to the upper portions of the cylinders.

12. A flowerpot or tank for water-cultured plants comprising a receptacle adapted to hold a nutrient solution; a cover providing an air space in the receptacle above the solution level; means for admitting air into said space while excluding light therefrom; and one or more perforated members of porous material mounted in the cover and extending down into the solution and adapted to support the entwined roots of plants, whereby the solution will rise by capillary attraction towards the upper portion of the member, the solution being aerated as it passes upwardly along the walls of the cylinder.

WILLIAM P. MUNSELL.